July 26, 1955 H. N. STEPHAN 2,713,811
TOOL SPINDLE MECHANISM
Filed May 26, 1950 3 Sheets-Sheet 1
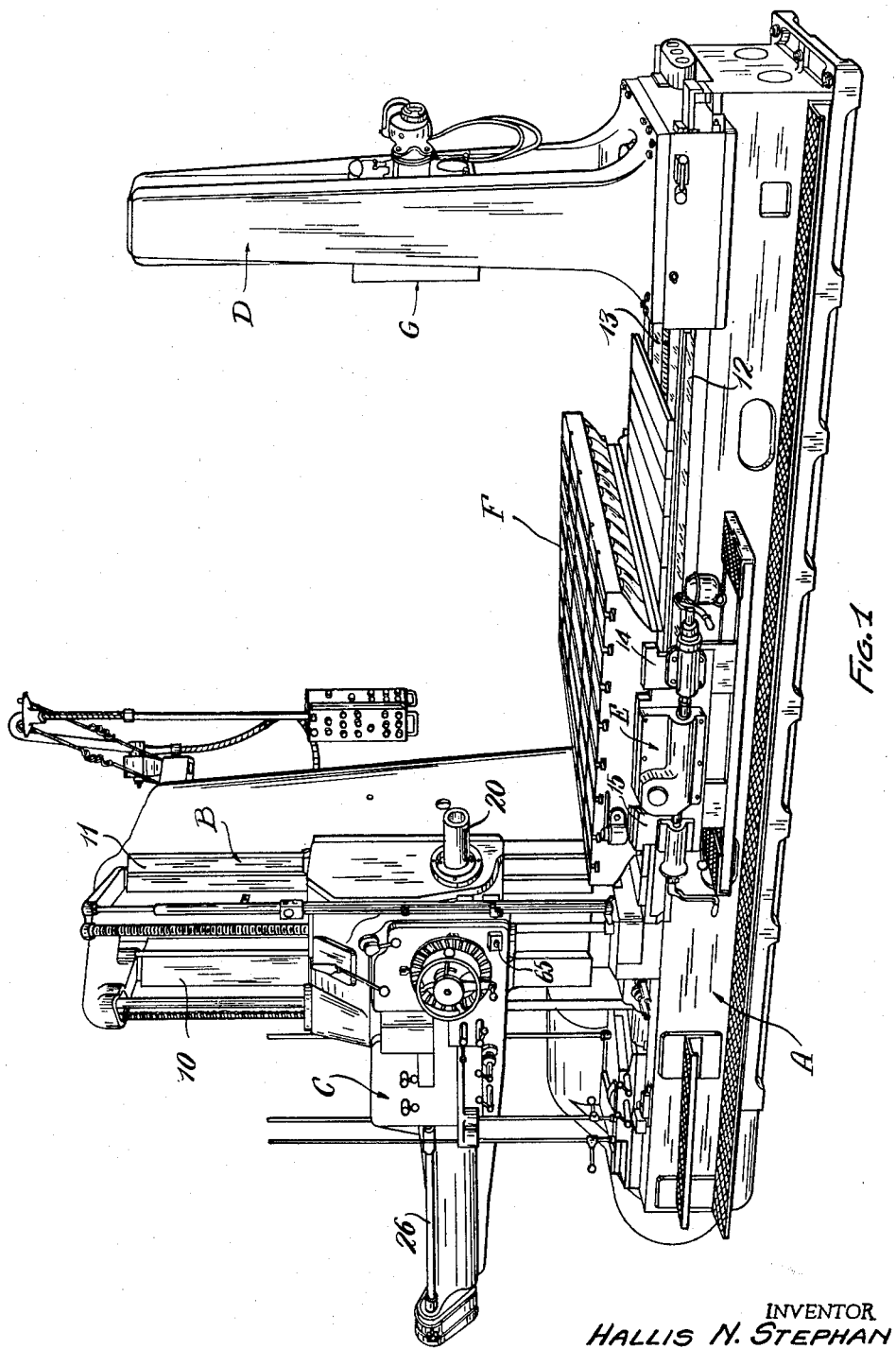
INVENTOR
HALLIS N. STEPHAN
BY Hudson, Boughton,
Williams, David & Hoffmann
ATTORNEYS July 26, 1955  H. N. STEPHAN  2,713,811
TOOL SPINDLE MECHANISM
Filed May 26, 1950  3 Sheets-Sheet 2
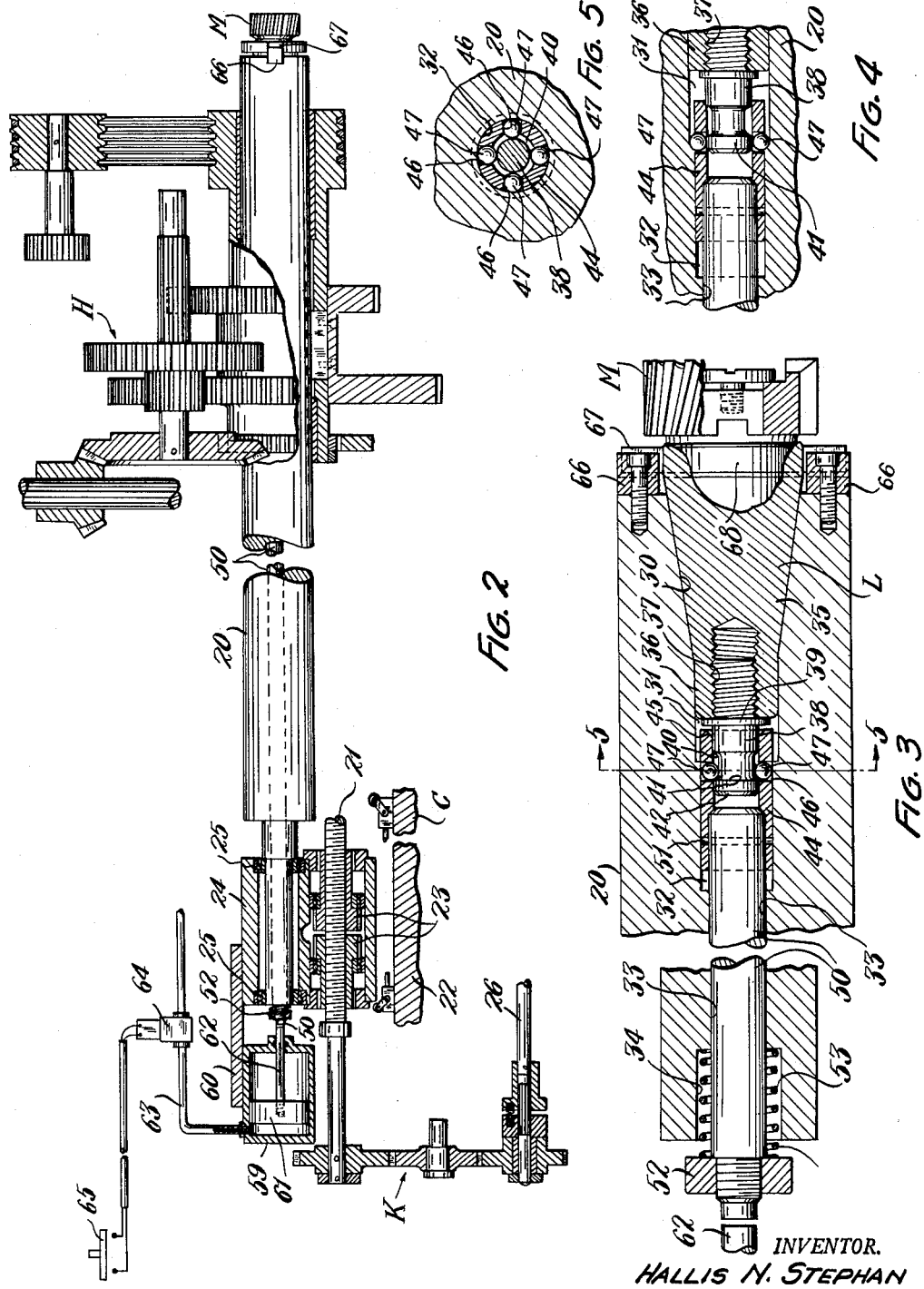
INVENTOR.
HALLIS N. STEPHAN
BY Hudson Boughton,
Williams, David & Hoffmann.
ATTORNEYS July 26, 1955  H. N. STEPHAN  2,713,811
TOOL SPINDLE MECHANISM
Filed May 26, 1950  3 Sheets-Sheet 3
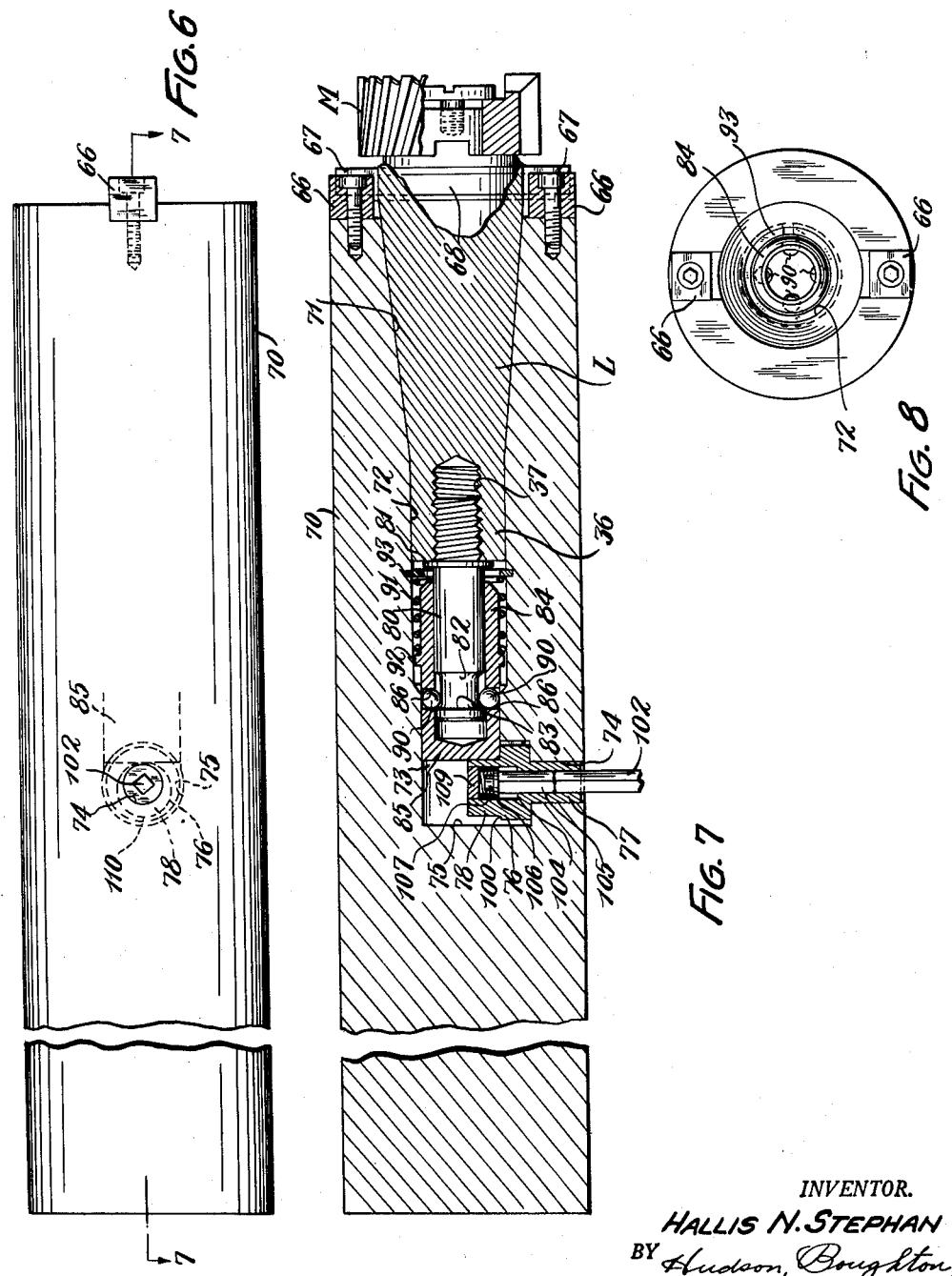
INVENTOR.
HALLIS N. STEPHAN
BY Hudson, Boughton,
Williams, David & Hoffmann
ATTORNEYS

United States Patent Office 2,713,811
Patented July 26, 1955

2,713,811
TOOL SPINDLE MECHANISM

Hallis N. Stephan, Cleveland Heights, Ohio, assignor to The New Britain Machine Company, New Britain, Conn., a corporation of Connecticut Application May 26, 1950, Serial No. 164,418

14 Claims. (Cl. 90—11)

The present invention relates to machine tools and more particularly to the tool spindle mechanisms thereof and especially to the spindle mechanism of combined horizontal boring, drilling and milling machines.

The tool end of the conventional spindle of a combined horizontal boring, drilling and milling machine, which spindle is usually several feet in length, is provided with a tapered socket into which the tapered shank of the tool, bar, etc., fits and is bound to secure the same to the spindle. The tool or more properly the shank of the tool, is bound or firmly seated in the tapered socket of the spindle by a holdback key and is driven out of the spindle by a drift pin or key.

Besides other disadvantages, conventional horizontal boring machine spindles do not permit arbors, tools, bars, etc., having standard milling machine tapered shanks to be attached to the spindle, thus requiring substantially duplicate sets of arbors, tools, etc., for each type of machine. The tapered shanks of conventional milling machine arbors, tools, bars, etc., are secured or bound to the spindle of the milling machine by a manually rotatable bar or rod which extends through the spindle and has a threaded end that screws into a tapped hole in the end of the tapered shank of the tool or bar. Similar bars or rods cannot be conveniently used with combined horizontal boring, milling and drilling machines because of the greater length of their spindles and the fact that the spindles are often fed lengthwise during cutting.

The principal object of the present invention is the provision of a novel and improved combined horizontal boring, drilling and milling machine comprising an axially movable rotatable spindle having a tapered aperture in its forward end adapted to receive the shanks of tools, arbors, bars, etc., preferably constructed in accordance with standard milling machine practice, and means for reciprocating the spindle axially comprising a member movable axially with the spindle and non-rotative relative thereto, in combination with binding or locking means within the spindle for fixedly binding or locking and in turn releasing the tools with the spindle, power means carried by the reciprocable but nonrotatable member, and preferably located adjacent to the rear end of the spindle, for operating said binding and releasing means, and means located within convenient reach of the operator, by which the operator can control operation of the power means while holding a tool etc., the shank of which is inserted in the tapered aperture in the spindle.

Another object of the present invention is the provision of a new and improved spindle mechanism for machine tools, such as combined horizontal boring, drilling and milling machines, comprising a spindle proper having an aperture in one end adapted to receive the shank of a tool, arbor, bar, etc., and quick acting mechanism including a member located within the spindle and movable axially therein to bind or lock the tools, bars, arbors, etc., in the aperture, in combination with means for actuating the member axially to quickly and conveniently attach and detach the tools, bars, arbors, etc., with the spindle.

The invention resides in certain constructions and combinations and arrangements of parts and further objects and advantages of the invention will be apparent to those skilled in the art to which it relates from the following description of preferred embodiments described with reference to the accompanying drawings forming a part of this specification and in which:

Fig. 1 is a perspective view of a combination horizontal boring, drilling and milling machine embodying the present invention;

Fig. 2 is a fragmentary view of the machine shown in Fig. 1, partly in section and partly schematic showing the tool spindle and certain parts of the driving mechanism therefor;

Fig. 3 is a sectional view of the tool spindle showing a conventional milling machine cutter attached therein;

Fig. 4 is a fragmentary sectional view showing certain parts of the mechanism shown in Fig. 3 but in a different position;

Fig. 5 is a sectional view taken substantially along line 5—5 of Fig. 3;

Fig. 6 is an elevational view of another form of tool spindle;

Fig. 7 is a sectional view taken substantially on line 7—7 of Fig. 6 and showing a conventional milling machine cutter attached to the spindle; and Fig. 8 is an elevational end view of the spindle shown in Fig. 6.

As stated previously, the principal object of the invention is the provision of a new and improved combination horizontal boring, drilling and milling machine and a new and improved spindle mechanism especially applicable to a combination horizontal boring, drilling and milling machine which will permit the use of conventional milling cutters, etc. Accordingly the invention contemplates the provision of a spindle having an aperture in the forward or tool receiving end thereof adapted to receive the shank of a tool, arbor, bar, or like device, and which aperture has a binding or locking mechanism therein adapted to engage the device inserted in the aperture and which locking device is operated to bind or release the device by longitudinal non-rotational movement of the locking member in the spindle. In one form of the invention as used in a combination horizontal boring, drilling and milling machine having a longitudinally movable spindle, the spindle is axially bored and a lock operating member is extended through the bore and is actuated by power mechanism at the rear of the spindle which power mechanism is carried axially with the spindle by being connected to a part of the spindle reciprocating means. The power mechanism is controlled by remote control mechanism actuated by an operator at the opposite end of the spindle. In an alternate form of the invention the locking member may be actuated by cam means within the spindle and adjacent to the tool receiving end thereof by a suitable wrench.

Referring to the drawings, I have shown a combination horizontal boring, drilling and milling machine which embodies the new and improved tool spindle mechanism. The machine shown is generally similar to that disclosed in the U. S. Patent to Lucas et al. 2,350,174, and comprises a base A, provided at one end with a spindle head column B formed with vertical ways 10 and 11 upon which a spindle head C is mounted for vertical movement, and at the other end with a backrest for an outboard support column D slidably supported on horizontal ways 12 and 13 on the upper side of the bed. The ways 12 and 13 also support a saddle E having transversely extending horizontal ways 14 and 15 on the upperside thereof which in turn supports a work table F. The backrest column D has vertical ways upon which a backrest block G is mounted for vertical movement.

The spindle head, outboard support column D, saddle E, table F and backrest block G may be moved in any conventional mechanism the details of which are not necessary for the understanding of the present invention and are not shown here.

The spindle head C supports a tool spindle 20, which spindle is adapted to be rotated by suitable driving mechanism indicated generally at H and which is more fully explained in the patent mentioned. The spindle 20 is also adapted to be fed or rapid traversed axially in either direction by a lead screw 21 rotatably supported in a part 22 of the spindle head and having threaded engagement with a two piece anti-back lash nut 23, located within the feed slide 24 which is carried by the spindle head C and connected to the spindle 20 adjacent to the left-hand end or rear of the spindle by bearings 25. The lead screw 21 is adapted to be rotated by power or manually and in either direction and at different speeds through a suitable power transmission including the shaft 26 and the gears K. Since the construction of such mechanism is conventional and not essential to the understanding of the present invention, they are not shown.

The forward end or nose of the spindle 20 is preferably provided with an aperture fashioned to receive the arbors of conventional milling machine tools and as shown has the form of a tapered socket 30 terminating in a cylindrical bore 31 the diameter of which is about one-third that of the spindle shown. The inner end of the bore 31 communicates with an axial bore 32 which is slightly smaller in diameter than the bore 31 and in turn communicates with an axial bore 33 extending to the rear end of the spindle. The portion of the bore 33 adjacent to the rear end is enlarged as at 34, the purpose of which will appear as the description proceeds. The socket 30 and bore 31 are adapted to receive a conventional milling machine tool arbor L the tapered shank 35 of which corresponds to the taper of the socket 30, and the rear cylindrical portion or pilot 36 of which fits into the bore 31. The pilot 36 is provided with the conventional tapped or threaded hole 37. According to the provisions of the present invention, the arbor is provided with an adapter or lock plug 38 threaded into the hole 37 before the arbor is inserted in the aperture 30. The lock plug 38 has an annular shoulder 39 which abuts the end of pilot 36, and a peripheral groove 40 formed about the plug adjacent to the outer end thereof provides a shoulder 41 for engagement by a binding or locking device located in bore 32. A conventional milling cutter M is connected to the arbor L in the usual manner.

The locking or binding device comprises a sleeve 44 axially movable in the bore 32 and which sleeve is adapted to receive the left hand end of the plug 38 therein. Preferably, the plug 38 is beveled at 42 and the sleeve 44 is beveled as at 45 to facilitate the entrance of the plug into the sleeve. The sleeve walls have a plurality of openings 46, preferably four, all lying within a transverse plane through the sleeve axis. The openings 46 are equally spaced from one another. Each opening 46 contains a steel ball 47 the diameter of which is slightly greater than the sleeve wall thickness so that the balls project from one end or the other of the openings 46. The inner edges of the openings 46 are peened over or otherwise restricted to prevent the balls from dropping from the openings into the sleeve. When the sleeve 44 is in the position shown in Fig. 3, the walls of the bore 32 force the balls 47 to project inwardly of the sleeve interior and enter the groove 40 of the plug 38, when the arbor L is in the socket 30, and when the sleeve is moved forwardly from the position shown in Fig. 3 to the position shown in Fig. 4 the balls may be easily moved to project outwardly of the sleeve into the larger bore 31 as shown, and permit the plug 38 to move freely into and out of the sleeve. By this arrangement, the sleeve and balls provide a quick acting locking or binding device for securing the arbor L into the socket 30 which device is operated by moving the sleeve 44 inwardly of socket 32 to force the balls 47 into the groove 40 and cooperate with the shoulder 41 of the plug 38 to draw the arbor into the socket 30 and to prevent withdrawal of the arbor from the spindle. When the sleeve 44 is moved forwardly the arbor is released.

In the preferred form of the invention, the sleeve 44 is attached to the forward end of a longitudinally movable actuating rod 50 secured therein by a pin 51, which rod projects through the bore 33 and extends beyond the rear end of the spindle as seen in Fig. 3. The outer end of the actuating rod 50 has a nut 52 threaded thereon and a relatively heavy compression spring 53 is disposed between the nut 52 and the inner end of the bore 34 so that the rod 50 is normally urged to the left as viewed in Fig. 3 to bias the sleeve 44 to the locking position. The tension of spring 53 is such that when the arbor L is secured in the socket 30 by the locking device the spring exerts the force necessary to maintain the arbor fixed in the socket under working or operating conditions. When no tool or other device is in the socket 30, the spring 53 maintains the inner end of the sleeve 44 in snug engagement with the inner end of the bore 32 to prevent chattering of the sleeve etc., during rotation of the spindle.

It will be seen that by moving the rod 50 to the right, sleeve 44 is moved forwardly to release the arbor from the socket, and in the preferred form of the invention the rod is moved forwardly by power means, which in the present case comprises a pneumatic motor including a cylinder 59 supported on the feed slide 24 by a support 60 so that it moves axially with the spindle. The cylinder 59 has a piston 61 therein having a piston rod 62 which is adapted to engage the outer end of the rod 50. The rear end of the cylinder 59 is connected by a flexible conduit or pipe 63 with a suitable source of fluid pressure such as a compressed air tank, not shown, and the flow of air to and from the cylinder is controlled by a conventional solenoid valve 64 which when energized directs air pressure into the cylinder and when deenergized releases air from the cylinder. The solenoid valve is preferably controlled by a push button switch 65 which may be placed in a convenient location on the spindle head in the vicinity of the forward or nose end of the spindle, which is generally four or five feet from the rear end. The construction is such that an operator in attaching or detaching a tool to the spindle may operate the locking mechanism within the spindle merely by depressing the switch 65.

The groove 40 is elongated as shown, permitting relative longitudinal movement between the member 38 and the sleeve 44 with the result that when the parts are in the position shown in Fig. 3 with the tool arbor locked in the socket 30 forward movement of the rod 62 by the piston 61 forces the outer end of the sleeve 44 against the shoulder 39 of the plug 38 to force the tool arbor from the socket, in the event it sticks therein, as the locking sleeve moves to the tool releasing position. The movement of rod 50 in the tool releasing direction is limited by the nut 52 engaging the end of the feed slide 24. The sizes of the various parts are preferably so proportioned that when the arbor L is inserted into the socket 30 the balls 47 will not drop into the groove 40 and the locking mechanism cannot be operated to bind the arbor in the socket, but the arbor will be left free to drop out, unless the normally provided keys 66 are properly engaged in the usual slots 67 provided in the arbor flange 68.

The construction shown is quick acting, efficient and may be conveniently controlled by the machine operator, although the spindle may be several feet in length. The mechanism is of relatively simple design and it can be readily assembled. For example, the rod 50 having the sleeve 44 thereon is inserted into bore 33 through socket 30 until the rear end projects from the far end of the spindle. Spring 53 is then positioned in bore 34 and nut 52 threaded onto the rod and against the spring. The outer ends of the holes 46 may be peened to prevent the balls 47 from falling out during assembly, if desired. By operating the locking or binding device by axial movement of the rod 50, no twisting or other like stresses are produced which might have a tendency to loosen the grip of the locking device on the tool, as would be the case, for example, in the event the plug 38 was integral with the rod 50 and threaded into the hole 37 as by a torque motor at the rear end of the spindle.

The socket 30 shown has the taper of a standard milling machine spindle so as to permit the use of standard milling arbors, tools, bars, etc., but it is to be understood that any suitable taper can be employed. It is also to be understood that in the event special arbors are to be provided, many changes can be made, for example, the member 38 may be formed integral with the arbor or the like. It is made detachable from the arbor in the present instance so as to adapt the locking means shown for use with conventional milling machine tools.

Referring now to the embodiment of the invention shown in Figs. 6, 7, 8, a combination horizontal boring, drilling and milling machine tool spindle embodying the invention is shown at 70 which, like the spindle 20 is adapted to receive the shank or arbor of conventional milling machine tools. The forward or nose end of the spindle is provided with a tapered socket 71 terminating in a bore 72 extending axially of the spindle. The socket 71 is tapered to receive the tapered arbor L for a conventional milling machine tool M and the bore 72 receives the cylindrical pilot 36 of the arbor. The bore 72 communicates with a coaxial bore 73 of slightly less diameter than the bore 72. A transversely extending bore 74 is provided in the spindle which opens into the rear portion of the bore 73 and the bore 74 is counterbored at 75 to accommodate a head portion 76 of a member 77 the shank of which is rotatably supported in the bore 74. The head 76 has an eccentric or cam 78 projecting therefrom.

As mentioned, the conventional milling machine arbor L, described with reference to the first embodiment of the invention, is adapted to be received in the tapered socket 71 and a plug 80 is threaded into the threaded hole 37 in the arbor. The plug 80 is similar to but slightly larger than the plug 38 and has a shoulder 81 corresponding to the shoulder 39 which is adapted to engage the inner end of the arbor and the outer end thereof is provided with a groove 82 corresponding to the groove 40 which groove 82 forms a shoulder 83 adjacent to the outer end of the plug.

A binding or locking mechanism is slidably supported in the bores 72, 73 and it comprises a sleeve 84 closed at its inner end 85 and adapted to receive the rear projecting end of the adapter or plug 80 into the forward end thereof. The sleeve 84 is preferably formed with four openings 86 through the walls thereof which openings lie in a plane normal to the sleeve axis and each opening has a steel ball 90 therein the diameter of which is greater than the thickness of the sleeve walls so that they project from one end or the other of the openings. Preferably, the inner ends of the openings 86 are constructed, as by peening, to prevent the balls from passing through the openings into the sleeve but permitting a substantial portion thereof to project into the sleeve. When the sleeve 84 is positioned in bores 72, 73 so that the balls 90 are within bore 72, they may be moved outwardly of the sleeve to permit passage of the projecting end of plug 80 thereby into the sleeve and when the sleeve is moved inwardly, the balls enter bore 73 and are forced by the walls thereof inwardly and project into the interior of the sleeve, as seen in Fig. 7. In the latter position, the balls 90 are adapted to engage within the groove 82 of the plug 80 and cooperate with the shoulder 83 to hold the arbor L in the socket 71.

The sleeve 84 is normally urged inwardly of the bore 73 by a heavy compression spring 91 which is interposed between an annular shoulder 92 formed on the exterior of the sleeve and a split ring 93 which is located in an annular groove formed in the bore 72. The spring 91 has sufficient pressure to maintain the sleeve in a position in which the balls 90 engage and lock the plug 80 in the sleeve and to maintain the arbor L in the socket 71 during operation of the tool.

The sleeve 84 is adapted to be moved outwardly of the bore 73 against the tension of spring 91 to permit the balls 90 to be moved outwardly into the bore 72 for the purpose of releasing the arbor L by the eccentric or cam 78 on the member 77 which is rotatably supported in the bore 74 and which eccentric is located within the end portion of the bore 73. The cam or eccentric 78 is adapted to be engaged by the inner end 85 of the sleeve 84 which is continually pressed into engagement with the cam by spring 91. The construction is such that the sleeve 84 moves axially as the cam is rotated. A shoulder 100 provided between the head portion 76 and cam 78 continuously engages the inner end of the sleeve 84 thereby holding the cam mechanism in the bore 74.

In assembling the locking mechanism, the cam member 77 is first inserted through the bore 73 and fitted in place after which the sleeve 84 is inserted in the bore 73. Spring 91 is then secured in position by installing the split-ring 93 in its groove.

The member 77 and in turn the cam 78 is adapted to be rotated by a suitable wrench 102 and for this purpose an axial bore 103 is formed through the member 77. The inner part of the bore 103 is counterbored circular, to form an undercut or shoulder as at 104 with the outer part of the bore which is square in cross-section and of reduced diameter. Chips and other dirt is prevented from entering the hole or wrench socket 103 by a plug 105 slidable therein and having a flange 106 which engages the shoulder 104. A compression spring 107 which is interposed between the flange 106 and a plug 109 which closes the inner end of the bore 103 continuously urges the member 105 in an outwardly direction. The outer end of the plug 105 is normally substantially flush with the outer end of the member 77 and as previously stated prevents dirt, chips and foreign matter from entering the spindle. The wrench 102, which is square in cross-section, may be inserted into the square portion of the bore 103 by pressing the plug 105 inwardly as seen in Fig. 7.

The cam 78 is shaped to move the sleeve 84 from the position shown in Fig. 7 outwardly to a position corresponding to that of the sleeve 49 as shown in Fig. 4. In this position the balls 90 are free and may move outwardly into the bore 72 to release the plug 78 of the arbor L, the outer end of the sleeve engages the shoulder 81 of plug 80 to eject the arbor. A slight flat, such as indicated by the reference character 110, on the high part of the cam may be provided for holding the cam in this position, if desired.

By rotating the cam through 180°, by the wrench 102, the sleeve 84 can be moved from its locking position to releasing position, or vice versa, and this may be accomplished by the operator while holding the milling arbor L, as the releasing mechanism is adjacent to the tool receiving end of the spindle and is readily accessible to the operator at this end of the spindle.

It is to be understood that only one eccentric member 77 is necessary to operate the locking device, but any conventional member could be provided.

Although the locking mechanism just described has been shown as applied to a machine tool spindle, it can be incorporated in an adapter device such as that shown in Figs. 4 and 5 of applicant's Patent No. 2,501,421, which adapter may be then connected in the conventional manner to the usual combination horizontal boring, drilling and milling machine spindle and the machine thus converted to one capable of using conventional milling machine tool arbors, etc.

From the foregoing, it will be apparent that the objects of the invention heretofore enumerated and others have been accomplished and that there has been provided a novel and improved spindle mechanism and combined horizontal boring, drilling and milling machine which will permit the use of conventional milling machine tools, arbors, etc., therewith even though the spindle is of such length that it is impractical for an operator to manually manipulate a locking device at the rear end of the spindle while holding a tool in the nose end. While preferred embodiments of the invention have been illustrated and described in considerable detail, the invention is not limited to the particular construction shown, for example, any suitable form of chuck operable by a plunger as from the rear of the spindle may be substituted for the particular chuck shown and it is my intention hereby to cover all adaptations and modifications which come within the practice of those skilled in the art to which the invention relates and within the scope of the appended claims.

Having described my invention, I claim:

1. In a machine tool spindle having a longitudinally extending aperture opening into its forward end, the forward portion of which aperture forms a tapered socket for the reception of a tool holding device to be attached to the spindle, a member within said aperture and reciprocable axially of said spindle, means for selectively connecting and disconnecting said member to and from a tool holding device positioned in said socket, spring means interposed between said spindle and said member for yieldably urging said member in a direction away from the forward end of the spindle, and means for moving said member in the opposite direction.

2. In a machine tool spindle having a longitudinally extending aperture opening into its forward end, the forward portion of which aperture forms a tapered socket for the reception of a tool holding device to be attached to the spindle, a member within said aperture and reciprocable axially of said spindle, means for selectively connecting and disconnecting said member to and from a tool holding device positioned in said socket, spring means interposed between said spindle and said member for yieldably urging said member in a direction away from the forward end of said spindle, and cam means within said aperture for moving said member in the opposite direction, said cam means being rotatable about an axis extending transversely of said spindle and comprising an actuating member accessible from the exterior of said spindle.

3. In a machine tool spindle having a longitudinally extending aperture opening into its forward end, the forward portion of which aperture forms a tapered socket for the reception of a tool holding device to be attached to the spindle, a member within said aperture and reciprocable axially of said spindle, means for selectively connecting and disconnecting said member to and from a tool holding device positioned in said socket, spring means interposed between said spindle and said member for yieldably urging said member in a direction away from the forward end of said spindle, and power means for moving said member in the opposite direction.

4. In a machine tool spindle having a longitudinally extending aperture opening into its forward end, the forward portion of which aperture forms a tapered socket for the reception of a tool holding device to be attached to the spindle, a member within said aperture and reciprocable axially of said spindle, means for selectively connecting and disconnecting said means to and from a tool holding device positioned in said socket, means adapted to engage said device when said member is moved in a direction toward the forward end of the spindle, spring means interposed between said spindle and said member for yieldably urging said member in a direction away from the forward end of said spindle, and means for moving said member in the opposite direction.

5. In a machine tool spindle having a longitudinally extending aperture opening into its forward end, the forward portion of which aperture forms a tapered socket for the reception of a tool holding device to be attached to the spindle, a member within said aperture and reciprocable axially of said spindle, means operatively connected to said member for selectively connecting and disconnecting said member to and from the tool holding device upon reciprocation of said member away from and toward the forward end of said spindle respectively, abutment means movable with said member and engageable with said device when said member is moved in a direction toward the forward end of said spindle, spring means interposed between said spindle and said member for yieldably urging said member in a direction away from the forward end of said spindle, and cam means within said aperture for moving said member in the opposite direction, said cam means being rotatable about an axis extending transversely of said spindle and comprising an actuating member accessible from the exterior of said spindle.

6. In a machine tool spindle having a longitudinally extending aperture opening into its forward end, the forward portion of which aperture forms a tapered socket for the reception of a tool holding device to be attached to the spindle, a member within said aperture and reciprocable axially of said spindle, means operatively connected to said member for selectively connecting and disconnecting said member to and from the tool holding device upon reciprocation of said member away from and toward the forward end of said spindle respectively, abutment means movable with said member and engageable with said device when said member is moved in a direction toward the forward end of said spindle, spring means interposed between said spindle and said member for continuously and yieldably urging said member in a direction away from the forward end of said spindle, and means for moving said member in the opposite direction.

7. In a machine tool spindle having a longitudinally extending aperture opening into its forward end, the forward portion of which aperture forms a tapered socket for the reception of a tool holding device to be attached to the spindle, a member within said aperture and reciprocable axially of said spindle, means operatively connected to said member for selectively connecting and disconnecting said member to and from the tool holding device upon reciprocation of said member away from and toward the forward end of said spindle respectively, abutment means movable with said member and engageable with said device when said member is moved in a direction toward the forward end of said spindle, spring means interposed between said spindle and said member for continuously and yieldably urging said member in a direction away from the forward end of said spindle, and power means for moving said member in the opposite direction.

8. In a machine tool spindle having a longitudinally extending aperture opening into its forward end, the forward portion of which aperture forms a tapered socket for the reception of the shank of a tool-holding device having a forwardly facing abutment adjacent to its rear end, a sleeve in said aperture adapted to receive the rear portion of said device including said abutment and slidable axially of said spindle, said sleeve having an opening through the wall thereof forwardly of said abutment when said device is positioned in said socket, a locking member in said opening in said sleeve and having a dimension greater than the thickness of the sleeve wall whereby the locking member projects from one end or the other of said opening, cam means externally of said sleeve and within said aperture engageable with said locking member when said sleeve is moved in one direction to urge said locking member to extend through said opening and project inside of said sleeve forwardly of said abutment, spring means for continuously and yieldably urging said sleeve in a direction away from the forward end of said spindle, and means for moving said sleeve in the opposite direction.

9. In a machine tool spindle having a longitudinally extending aperture opening into its forward end, the forward portion of which aperture forms a tapered socket for the reception of the shank of a tool-holding device to be attached to the spindle, which device has a forwardly facing abutment adjacent to its rear end, a sleeve in said aperture adapted to receive the rear portion of said device including said abutment and slidable axially of said spindle, said sleeve having an opening through the wall thereof positioned forwardly of said abutment when said device is positioned in said socket, a locking member in said opening in said sleeve and having a dimension greater than the thickness of the sleeve wall whereby the locking member projects from one end or the other of said opening, cam means externally of said sleeve and within said aperture engageable with said locking member when said sleeve is moved in a direction away from the forward end of said spindle to urge said locking member to extend through said opening and project inside of said sleeve forwardly of said abutment, spring means operatively connected to said spindle and to said sleeve for moving said sleeve in a direction toward the forward end of said spindle, and cam means within said aperture for moving said sleeve in the opposite direction, said cam means being rotatable about an axis extending transversely of said spindle and comprising an actuating member accessible from the exterior of said spindle.

10. In a machine tool spindle having a longitudinally extending aperture opening into its forward end, the forward portion of which aperture forms a tapered socket for the reception of the shank of a tool-holding device to be attached to the spindle, which device has both forwardly and rearwardly facing abutments adjacent to its rear end, a sleeve in said aperture adapted to receive the rear portion of said device including said forwardly facing abutment and slidable axially of said spindle, said sleeve having an opening through the wall thereof positioned forwardly of said forwardly facing abutment when said device is inserted in said socket, a locking member in said opening in said sleeve and having a dimension greater than the thickness of the sleeve wall whereby the locking member projects from one end or the other of said opening, cam means externally of said sleeve and within said aperture engageable with said locking member when said sleeve is moved in a direction away from the forward end of said spindle to urge said locking member to extend through said opening and project inside of said sleeve forwardly of said forwardly facing abutment, said sleeve having a part engageable with said rearwardly facing abutment when said sleeve is moved in a direction toward the forward end of said spindle to thereby urge said device from said aperture, spring means for continuously and yieldably urging said sleeve in a direction away from the forward end of said spindle, and means for moving said sleeve in the opposite direction.

11. In a machine tool spindle having a longitudinally extending aperture opening into its forward end, the forward portion of which aperture forms a tapered socket for the reception of the shank of a tool-holding device having a forwardly facing abutment adjacent to its rear end, a sleeve in said aperture adapted to receive the rear portion of said device including said abutment and slidable axially of said spindle, said sleeve having an opening through the wall thereof forwardly of said abutment when said device is positioned in said socket, a locking member in said opening in said sleeve and having a dimension greater than the thickness of the sleeve wall whereby the locking member projects from one end or the other of said opening, cam means externally of said sleeve and within said aperture engageable with said locking member when said sleeve is moved in one direction to urge said locking member to extend through said opening and project inside of said sleeve forwardly of said abutment, spring means for continuously and yieldably urging said sleeve in a direction away from the forward end of said spindle, and power means for moving said sleeve in the opposite direction.

12. In a machine tool, a frame member, a tool spindle provided with a longitudinally extending aperture opening into its forward end, the forward portion of which aperture forms a tapered socket for the reception of a tool-holding device to be attached to the spindle, means for rotatably supporting said spindle in said frame member, means for rotating said spindle, means for slidably supporting said spindle in said frame member for reciprocation lengthwise of its axis of rotation, means for reciprocating said spindle lengthwise of its axis of rotation, a movable member within said aperture and reciprocable axially of said spindle, means operatively connected to said movable member for selectively connecting and disconnecting said movable member to and from a tool-holding device positioned in said socket upon reciprocation of said movable member away from and toward the forward end of said spindle respectively, spring means interposed between said spindle and said movable member for yieldably urging said movable member in a direction away from the end of said spindle provided with said socket to actuate said means to connect the tool-holding device positioned in said socket to said spindle, and means reciprocable with said spindle for moving said movable member in the opposite direction, said movable member being adapted to abut said tool device and eject the same from said socket when moved by said last-named means.

13. In a machine tool, a frame member, a tool spindle provided with a longitudinally extending aperture opening into its forward end, the forward portion of which aperture forms a tapered socket for the reception of a tool-holding device to be attached to the spindle, means for rotatably supporting said spindle in said frame member, means for rotating said spindle, means for slidably supporting said spindle in said frame member for reciprocation lengthwise of its axis of rotation, means for reciprocating said spindle lengthwise of its axis of rotation, a non-rotatable member operatively connected to and reciprocable with said spindle, a movable member within said aperture and reciprocable axially of said spindle, means operatively connected to said movable member for selectively connecting and disconnecting said movable member to and from a tool-holding device positioned in said socket upon reciprocation of said movable member away from and toward the forward end of said spindle respectively, spring means interposed between said spindle and said movable member for yieldably urging said movable member in a direction away from the end of said spindle provided with said socket to actuate said means to connect the tool-holding device positioned in said socket to said spindle, and power means carried by said non-rotatable member for moving said movable member in the opposite direction, said movable member being adapted to abut said tool device and eject the same from said socket when moved by said power means.

14. In a machine tool, a frame member, a tool spindle provided with a longitudinally extending aperture opening into its forward end, the forward portion of which aperture forms a tapered socket for the reception of a tool-holding device to be attached to the spindle, means for rotatably supporting said spindle in said frame member, means for rotating said spindle, means for slidably supporting said spindle in said frame member for reciprocation lengthwise of its axis of rotation, means for reciprocating said spindle lengthwise of its axis of rotation, a movable member within said aperture and reciprocable axially of said spindle, means operatively connected to said movable member for selectively connecting and disconnecting said movable member to and from a tool-holding device positioned in said socket upon reciprocation of said movable member away from and toward the forward end of said spindle respectively, spring means interposed between said spindle and said movable member for yieldably urging said movable member in a direction away from the end of said spindle provided with said socket to actuate said means to connect the tool-holding device positioned in said socket to said spindle, cam means within said aperture and rotatable about an axis extending transversely of said spindle for moving said movable member in the opposite direction, said movable member being adapted to abut said tool device and eject the same from said socket when moved by said power means, and means accessible from the exterior of said spindle for actuating said cam means.

References Cited in the file of this patent

UNITED STATES PATENTS

| | | |
|---|---|---|
| 634,157 | Willard | Oct. 3, 1899 |
| 1,119,276 | Griffith et al. | Dec. 1, 1914 |
| 1,438,138 | Rossignol | Dec. 5, 1922 |
| 1,457,550 | Runkel | June 5, 1923 |
| 1,547,706 | Whitmore | July 28, 1925 |
| 1,714,684 | Malcom | May 28, 1929 |
| 1,961,129 | DeHaas | June 5, 1934 |
| 2,026,448 | Turretini | Dec. 31, 1935 |
| 2,190,134 | Garside et al. | Feb. 13, 1940 |
| 2,430,843 | Colwell | Nov. 11, 1947 |

FOREIGN PATENTS

| | | |
|---|---|---|
| 342,678 | Great Britain | Jan. 26, 1931 |